Sept. 13, 1949.　　　　　　E. R. OWENS　　　　　　2,481,863
PHOTOELECTRIC APPARATUS FOR DETECTING
SURFACE DEFECTS IN GLASSWARE Filed April 26, 1945　　　　　　　　　　　　3 Sheets-Sheet 1

Inventor
ELLIOTT R. OWENS

By Rule and Hoge
Attorneys

Sept. 13, 1949.　　　　　　　E. R. OWENS　　　　　　　2,481,863
PHOTOELECTRIC APPARATUS FOR DETECTING
SURFACE DEFECTS IN GLASSWARE
Filed April 26, 1945　　　　　　　　　　　　　　3 Sheets-Sheet 2
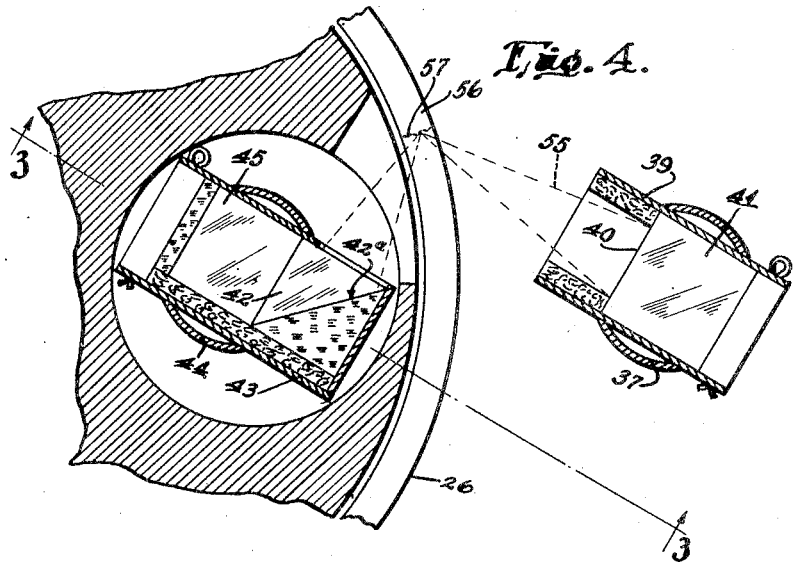
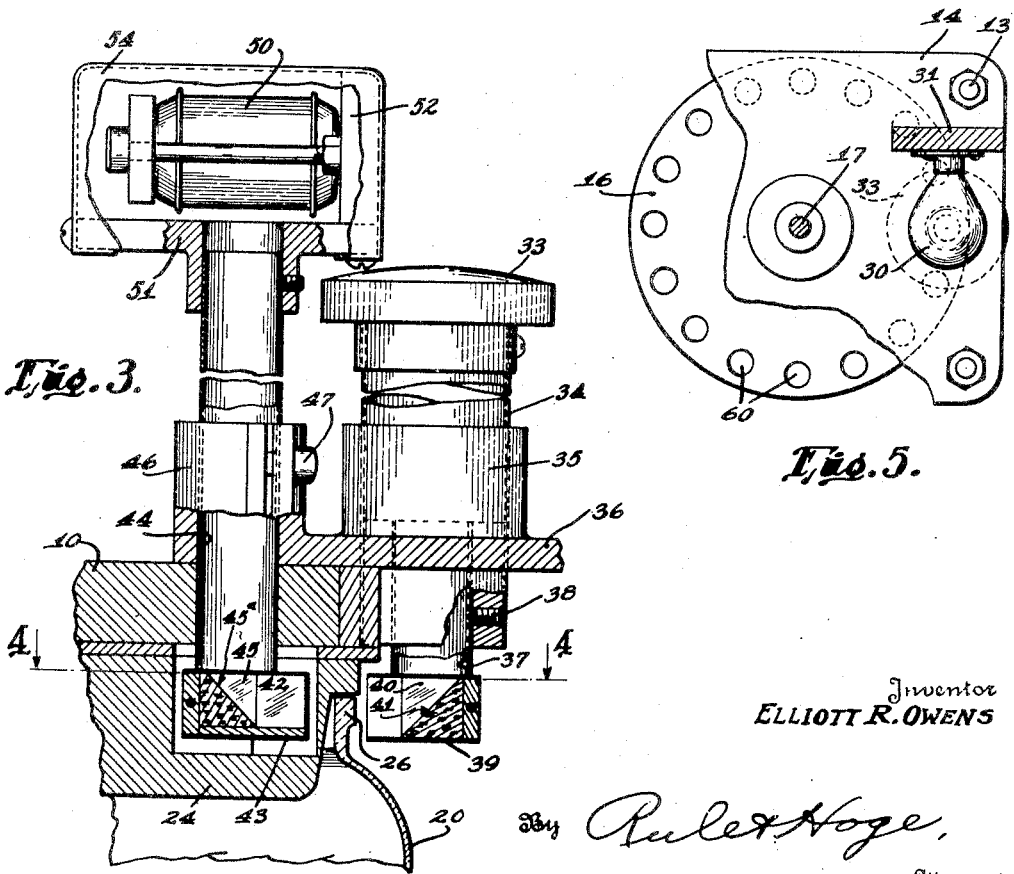
Inventor
ELLIOTT R. OWENS
By Ruley Hoge
Attorneys Sept. 13, 1949.  E. R. OWENS  2,481,863
PHOTOELECTRIC APPARATUS FOR DETECTING
SURFACE DEFECTS IN GLASSWARE
Filed April 26, 1945  3 Sheets-Sheet 3

Inventor
ELLIOTT R. OWENS
By Rule and Hoge,
Attorneys

Patented Sept. 13, 1949

2,481,863

UNITED STATES PATENT OFFICE 2,481,863

PHOTOELECTRIC APPARATUS FOR DETECTING SURFACE DEFECTS IN GLASSWARE

Elliott R. Owens, Whittier, Calif., assignor to Owens Illinois Glass Company, a corporation of Ohio Application April 26, 1945, Serial No. 590,399

3 Claims. (Cl. 88—14)

My invention relates to apparatus for inspecting bottles, jars, and other containers or articles made of glass or like material, for the purpose of detecting crizzles, checks, fire cracks, tears, and other defects in or near the surface of the article. The invention in the form herein illustrated is particularly adapted for use in detecting surface irregularities or defects in the finishes or sealing surfaces of the articles under test.

Containers such as glass bottles and jars are extensively used at the present time for sealing products under a partial vacuum, and the requirements in respect to the sealing surfaces are exacting. Containers made of glass are inherently subject to surface defects such as minute cracks or fissures, plunger marks, seeds, surface lines, blisters, and the like, many of which are not easily detected by the usual methods of inspection. Any such defect in the sealing surface is apt to permit a slow leakage after the container is sealed. An object of the present invention is to provide detecting means operable automatically to detect any such defects and actuate indicating means, thereby enabling the defective articles to be segregated from the others.

A further object of the invention is to provide an apparatus operable to cause the surface under test to traverse a beam of light in such a manner that light is reflected from the surface of any crack, check, crizzle or similar surface defect and directed to a photoelectric cell or tube. The latter operates to produce an electrical impulse which is amplified, and serves to operate indicating means.

Other objects of the invention will appear hereinafter.

Referring to the accompanying drawings which illustrate an apparatus embodying the present invention in a form particularly adapted for inspecting the sealing surfaces or finishes of jars, bottles, or other containers:

Fig. 3 is a fragmentary part-sectional elevation on a larger scale showing particularly the condensing lens, reflectors and phototube, the section being at the line 3—3 on Fig. 4.

Fig. 4 is a section, on a still larger scale, at the line 4—4 on Fig. 3.

Fig. 5 is a fragmentary part-sectional plan showing the light source and the light chopper disk.

Figure 1:
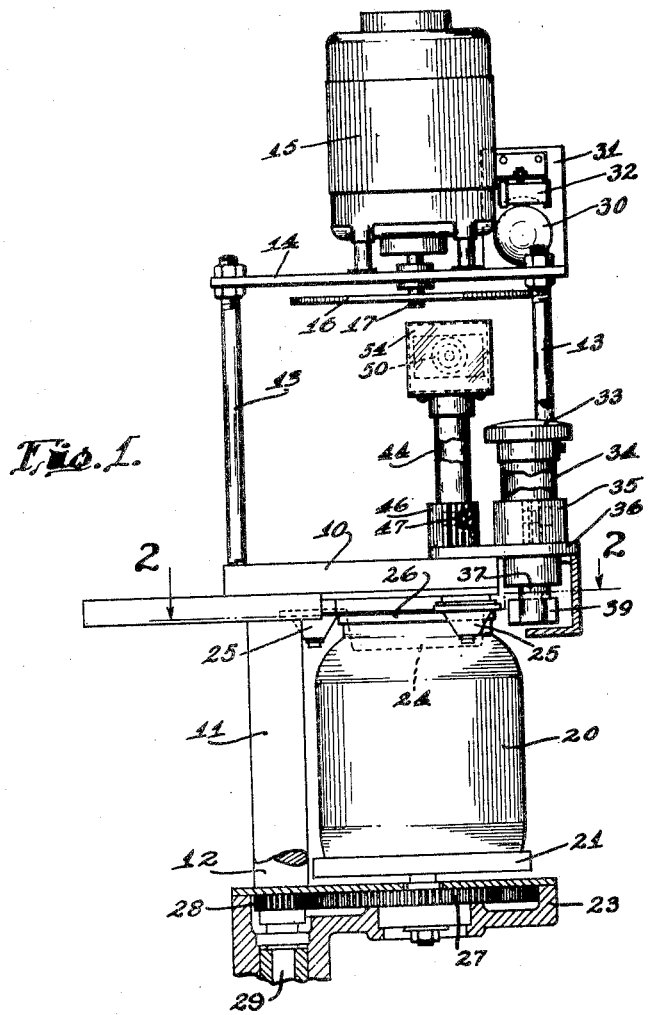
Fig. 1 is a part-sectional elevation of the apparatus with parts broken away.
Figure 2:
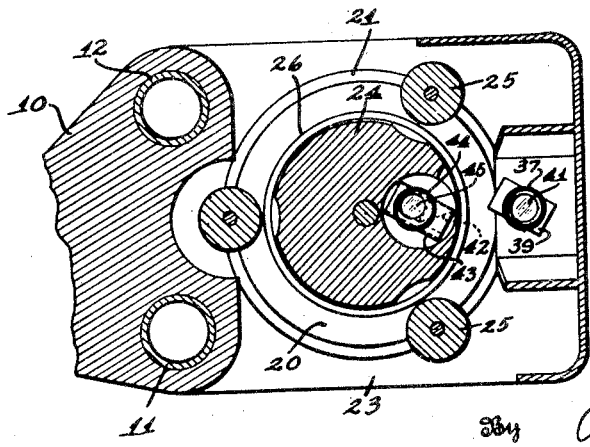
Fig. 2 is a section at the line 2—2 on Fig. 1.

Referring particularly to Figs. 1 and 2, the detecting apparatus is mounted on a supporting frame comprising a platform 10 carried on posts 11 and 12. Vertical rods 13 secured at their lower ends on the platform 10 carry an upper platform 14 on which is mounted an electric motor 15. The motor drives a horizontal light chopper disk 16 attached to the lower end of the motor shaft 17. The purpose and operation of the chopper disk are set forth hereinafter.

The article 20 to be inspected, herein shown as a glass jar, is placed on a pad 21 in the form of a circular disk. The pad is mounted for rotation on a bracket 23 which may be lifted and lowered for bringing the jar into and out of position for the test. As the jar is lifted for the testing operation, it is centered by a frusto-conical stationary block 24 which enters the mouth of the jar. Conical rolls 25 are positioned and arranged to contact the rim 26 of the jar and hold the jar centered as it rotates.

The pad 21 with the jar thereon is rotated continuously by an electric motor (not shown) operating through a gear train including a spur gear 27, pinion 28 and a vertical shaft 29. The mechanism for lifting and lowering the bracket 23 may be the same as that disclosed in the patent to Fedorchak, No. 2,355,719, August 15, 1944, Gauging and seam-detecting apparatus.

The light source of the detecting apparatus is herein shown as an electrical lamp 30, prefocused and mounted on a supporting plate 31 extending upward from the platform 14. A collecting reflector 32 above the lamp reflects light downward and directs it to a condensing lens 33. The lens is attached to the upper end of a metal tube 34 which is adjustable up and down within a bearing sleeve 35 formed on a plate 36 supported on the platform 10. Telescopically connected with the tube 34 for vertical and rotary adjustment therein, is a tube 37 secured in adjusted position by a set screw 38. Attached to the lower end of the tube 37 is a box 39 in which is mounted a prism 40 of glass, or the like. The prism is formed with an inclined surface 41 coated with silver or other reflecting material to provide a reflecting surface.

A second reflecting prism 42 is mounted in a box 43 attached to the lower end of a tube 44. As shown in Fig. 3, the prisms 40 and 42 are at the same level and at about the same height as the rim 26 of the container. As shown in Fig. 4, the light beam 55 is projected horizontally from the reflecting surface 41 and strikes the surface 56 under test at an angle of substantially 45 degrees to the direction of movement of said surface. The testing zone or area of the surface 56, namely, the area at which light strikes said surface, is preferably a short distance within the focal point of the beam of light. Any surface defect 57 passing through the testing zone is thus brought within the concentrated light beam and reflects light toward the reflecting prism 42 which is positioned to receive light rays reflected from the surface defect 57 at an angle of about 90 degrees to the incident rays.

The prism 42 has a reflecting surface 42ª which extends in a vertical plane and is arranged diagonally with respect to the incident light rays for projecting them toward a third prism 45 also mounted in the box 43. The prism 45 has a reflecting surface 45ª inclined at an angle of 45 degrees for reflecting the light vertically through the tube 44. The prisms and their reflecting surfaces may be all of the same materials as above described in reference to the prism 40.

The tube 44 is adjustable up and down in a split bearing sleeve 46 formed on the plate 36 and is clamped in adjusted position by a screw 47. Mounted on the upper end of the tube 44 is a frame for supporting a photoelectric cell 50, said frame comprising a base 51 and an upright member 52. The cell is enclosed in a casing 54.

The photocell 50 or "electric eye" may be of conventional construction, either a high vacuum photoemissive tube or a tube of the gas-filled type.

While the pad 21 is in lowered position, a jar 20 is placed thereon and then lifted to the testing position (Figs. 1 and 3) and rotated while held in centered position by the rolls 25. Light is directed downward from the lamp 30 and reflector 32 and passes through the condensing lens 33 by which the light rays are focused or converged to form a beam of light which enters the prism 40 and is reflected horizontally from the surface 41. This horizontal beam of light 55 (Fig. 4) is directed toward the upper surface 56 or finish of the horizontally-rotating jar, said surface being formed on the rim 26 of the jar.

Any defect 57 in the sealing surface 56, such as a crizzle, check, tear, minute fissure or break in the skin or surface of the glass, as it passes through the light beam 55, will present a reflecting surface by which a portion of the light beam is reflected toward the prism 42. The light entering the prism 42 is reflected from the surface 42ª horizontally toward the prism 45, the surface 45ª of which directs the light vertically upward through the tube 44 to the photocell 50.

It is found that substantially any defect 57 in the surface of the glass such as a crack or crizzle whether extending across the surface at right angles to the direction of movement or at some other angle or irregularly, will reflect a portion of the beam of light and direct it against the prism 42 so that a flash of light is transmitted to the photocell and operates to produce therein an electrical impulse.

It will be observed that if the defect 57 is in the nature of a crack or crevice below the level of the surface 56, the beam of light 55 must penetrate the glass before it contacts the defect and is reflected therefrom. Light of various wave lengths may be used provided they come within the spectral transmission range of the glass which is being tested.

I have found that with some types of testing apparatus and in testing certain lines of ware, it is advisable to provide some means either electrical, such as an oscillator, or mechanical, for causing the photocell to give an alternating current signal adaptable to the work in hand and which favilitates the amplification of the electric impulse. In the apparatus herein disclosed, the light chopper disk 16 used for this purpose, is positioned to extend across the path of the light rays between the lamp 30 and the lens 73 and is provided with an annular series of openings 60 which as the disk rotates, cross the path of the light beam. The disk may be made of aluminum and is rotated at a high speed. If the motor 15 is driven, for example, at or approximately at 3450 R. P. M., a chopper disk with fifteen holes will produce about 862 flashes of light per second or 431 cycles in an A. C. circuit. This gives satisfactory results and is found to be practical because it is near one of the standard frequencies for electronic equipment and simplifies the combination of the photoemissive cell with standard amplifier elements.

Figure 6:
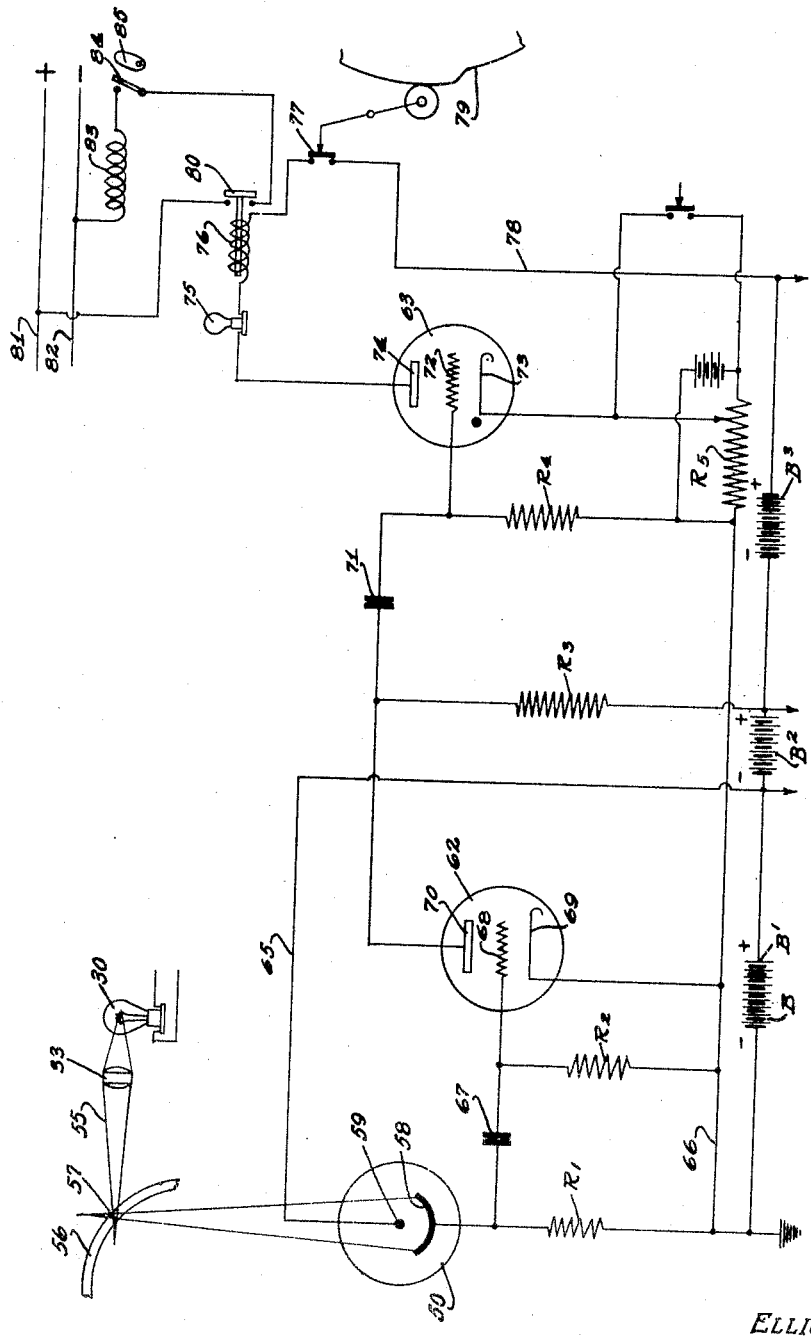
Fig. 6 is a wiring diagram of the apparatus.

Referring to Fig. 6, there is provided amplifying means by which a current impulse from the phototube 50 is amplified sufficiently to operate signaling devices and switches or relays in controlling circuts for any suitable mechanism for rejecting defective ware or segregating it from the articles which pass the test. The amplifying mechanism includes an amplifier tube 62 which may be a vacuum tube or triode of standard construction, and a gas-filled tube 63. The anode 59 of the phototube is connected through a wire 65 to the positive terminal $B^1$ of the battery B, the negative terminal of which is grounded. A resistor $R^1$ is connected between the cathode 58 and ground wire 66. When the phototube is energized by a flash of light projected thereon as before described, the conductivity is increased with an increase in flow of current through the circuit including wire 65, battery B and resistor $R^1$. The voltage balance across the condenser 67 is thus upset causing the condenser to start a flow of current through the resistor $R^1$, ground wire 66 and a resistor $R^2$. This current flow causes the bias voltage of the grid 68 to be less negative with respect to the cathode 69. This results in an instantaneous increase in the flow of current through the plate circuit of the tube 62, said circuit including the plate 70, a resistor $R^3$ and batteries $B^2$, B. The current in this plate circuit is thus amplified to a sufficient degree to operate the tube 63, the latter in turn serving to operate a signal and relay presently to be described.

The change or increase in plate current of tube 62 causes an unbalance of the potential across a condenser 71. This results in a current flow from one side of the condenser through a resistor $R^4$ to ground wire 66 and through batteries B, $B^2$ and a resistor $R^3$ to the other side of the condenser. One side of the condenser 71 is connected to the control grid 72 of the tube 63. This grid has a bias sufficiently negative in respect to its cathode 73 to prevent it from passing current from the cathode to the anode or plate 74. However, the condenser 71 in releasing electrical energy and starting a current flow as above described for restoring equilibrium, causes the grid 72 to become less negative with respect to its cathode 73, to a degree which permits a current flow from the cathode to the anode and on through the plate circuit. This circuit extends from the plate 74 through an indicator 75, such as a neon indicator lamp, a relay magnet coil 76, a switch 77, wire 78, batteries $B^3$, $B^2$ and B to ground wire 66 and thence through a resistor $R^5$ and to the cathode 73. The gas-filled tube 63 when once fired or set into operation as above described, operates on direct current and continues to pass current until the anode circuit is opened regardless of the grid bias voltage so that it keeps the relay coil 76 energized until the switch 77 is opened.

The switch 77 is opened after each testing operation is completed and is closed before the next test commences.

The relay magnet 76 operates to close a switch 80 in an ejector circuit connected across the mains 81 and 82 connected to a source of current supply. Said circuit includes a magnet coil 83 forming part of an ejector mechanism, and a switch 84 which is closed by a cam 85. The ejecting mechanism may be of any approved form such, for example, as that disclosed in my Patent No. 2,338,868, January 11, 1944, Gauging apparatus, and may be operated in a similar manner. Ejecting mechanism such as disclosed in the Fedorchak Patent No. 2,371,748, March 20, 1945, Article handling apparatus, may be employed if desired.

Modifications may be resorted to within the spirit and scope of my invention.

I claim:

1. Apparatus for testing the annular sealing surface of a glass container such as a jar or bottle, said apparatus comprising a support for the article rotatable about a vertical axis for thereby rotating a said article and causing the surface under test to traverse a testing zone, an electric lamp, means for directing light rays downward from said lamp, a vertical tube, a condensing lens at the upper end thereof, said lens being in the path of said downwardly directed light rays for converging said rays as they pass downward through the tube, a reflecting prism at the lower end of said tube comprising a reflecting surface inclined at an angle to deflect the light beam horizontally toward the testing zone, a second prism displaced from the path of light rays reflected from the said surface of the container passing through said zone, said second prism having a reflecting surface positioned to receive light reflected in a different direction by a surface defect passing through said zone, a third prism having a reflecting surface in the path of the reflected light from said second prism and inclined in a direction to reflect the light upwardly, a tube extending upwardly from said third prism through which the light is directed, a photoelectric cell above said last mentioned tube in position to be energized by said upwardly directed light, and indicating means controlled by said photoelectric cell.

2. The combination of a support for a glass jar or other glass article having an annular sealing surface, means for rotating the support and an article thereon about the vertical axis of said surface and thereby causing the surface to move in a horizontal path and to traverse a testing zone, a vertical tube mounted at one side of said path and extending upwardly thereabove, a condensing lens on the upper end of said tube, an electric lamp mounted above said lens and arranged to direct a light beam downward through the lens and cause it to be condensed, a reflecting prism at the lower end of said tube having an inclined reflecting surface arranged to direct the beam of light across the surface under test at said testing zone, a second reflecting prism positioned to receive horizontal rays of light from said beam reflected from the surface of a crack, crizzle, or other defect in the said sealing surface, a photoelectric cell, means for directing light reflected from said second prism to said cell, and indicating means controlled by said cell.

3. The combination of a support for a glass jar or other glass article having an annular sealing surface, means for rotating the support and an article thereon about the vertical axis of said surface and thereby causing the surface to move in a horizontal path and to traverse a testing zone, a vertical tube mounted at one side of said path and extending upwardly thereabove, a condensing lens on the upper end of said tube, an electric lamp mounted above said lens and arranged to direct a light beam downward through the lens and cause it to be condensed thereby, a reflecting prism at the lower end of said tube having an inclined reflecting surface arranged to direct the beam of light across the surface under test at said testing zone, a second prism having a reflecting surface positioned in the path of light rays reflected from the surface of a defect in said sealing surface under test, said reflecting surfaces being at substantially the same height and intersected by a horizontal plane at the level of the said surface under test, a light sensitive cell, and means for causing the light rays reflected from said second prism to impinge on said cell.

ELLIOTT R. OWENS.

REFERENCES CITED

The following references are of record in the file of this patent:

UNITED STATES PATENTS

| Number | Name | Date |
| --- | --- | --- |
| 1,640,567 | Firestone | Aug. 30, 1927 |
| 1,925,814 | Nicolson | Sept. 5, 1933 |
| 1,934,187 | Glasgow et al. | Nov. 7, 1933 |
| 1,979,722 | Zworykin | Nov. 6, 1934 |
| 2,008,567 | Simonton | July 16, 1935 |
| 2,065,713 | Knobel et al. | Dec. 29, 1936 |
| 2,219,572 | Everett | Oct. 29, 1940 |
| 2,313,218 | Brace et al. | Mar. 9, 1943 |
| 2,318,856 | Hoffman | May 11, 1943 |
| 2,335,686 | Mercur | Nov. 30, 1943 |

FOREIGN PATENTS

| Number | Country | Date |
| --- | --- | --- |
| 381,335 | Great Britain | Oct. 6, 1932 |
| 649,180 | Germany | Aug. 17, 1937 |